Patented Oct. 8, 1946

2,408,744

UNITED STATES PATENT OFFICE 2,408,744

PROCESS OF PRODUCING ESTERS

Karl H. Engel, Teaneck, N. J., assignor to Allied Chemical & Dye Corporation, New York, N. Y., a corporation of New York No Drawing. Application April 11, 1945, Serial No. 587,827

8 Claims. (Cl. 260—461)

This invention relates to the production of tri-esters of phosphorous acid.

It has been proposed to manufacture tri-esters of phosphorous acid by reacting an alcohol with phosphorus trichloride in the presence of a relatively large amount of a diluent inert solvent for the ester and an organic base such as pyridine containing a tertiary nitrogen atom which reacts with the hydrogen chloride liberated during the reaction to form the hydrochloride of the base, separating the hydrochloride crystals from the tri-esters by washing the reaction mixture with water or filtration and then separating the solvent and other impurities from the ester by fractional distillation. The reaction is carried out at temperatures below the melting point of the hydrochloride and, in order to prevent the large amount of hydrochloride crystals formed from interfering with intimate and rapid intermixture of the phosphorus trichloride with the alcohol, it is necessary to employ a large amount of solvent as a diluent in the reaction mixture. This process is subject to the disadvantage that the fine hydrochloride crystals formed during the reaction are difficult to remove from the ester by filtration, and washing the reaction product with water results in hydrolysis of the ester which may result in contamination of the reaction product with undesirable acidic materials such as mono-phosphites. The amount of solvent required in the process seriously reduces the capacity of the equipment and necessitates the use of equipment of substantially greater capacity for the production of a given amount of the tri-ester than would be necessary if it were feasible to dispense with all or most of the solvent.

It is an object of this invention to provide an improved process for the production of tri-esters of phosphorous acid.

It is a further object of the invention to provide a process of producing tri-esters of phosphorous acid whereby some or all of the solvent customarily employed in making these esters may be dispensed with and the tri-esters readily separated from the other constituents of the reaction mixture without washing the mixture with water or filtration. Other objects and advantages will appear hereinafter.

In accordance with the invention, tri-esters of phosphorous acid are manufactured by reacting an aliphatic or cycloaliphatic alcohol or a phenol, or a mixture of two or more such organic hydroxy compounds with phosphorus trichloride in the presence of an acid-accepting organic base having a tertiary nitrogen atom which reacts with the hydrogen chloride liberated during the reaction to form a hydrochloride having a melting point not above 110° C. under the conditions of the reaction, and after the reaction is substantially complete separating the hydrochloride in the liquid phase from the tri-ester at a temperature above the melting point of the hydrochloride. The reaction is carried out at temperatures high enough to prevent formation of sufficient hydrochloride crystals to interfere with rapid intermixture of the reactants. After separation of the hydrochloride is accomplished, the ester may be recovered from the other constituents of the reaction mixture by fractional distillation, preferably under vacuum.

I have found that by employing as hydrogen chloride acceptors organic bases having a tertiary nitrogen atom whose hydrochlorides melt at a temperature not above 110° C. in the presence of the other constituents of the reaction mixture and separating the hydrochloride in the liquid phase at a temperature above its melting point from the remainder of the reaction mixture, excellent removal of the hydrochloride from the tri-ester is accomplished without washing the reaction mixture with water or filtration. Further, by using a base whose hydrochloride melts not above 110° C. and separating the hydrochloride in the molten state from the tri-ester, the diluent solvent customarily employed may be eliminated or employed in greatly reduced amount as compared with the amount customarily employed heretofore. The elimination or substantial reduction of the amount of solvent permits marked operating economies since it substantially reduces the volume of the reaction mixture and correspondingly increases the capacity of the apparatus employed for carrying out the process.

The preferred tri-esters to which the invention relates may be represented by the formula

in which R, R', R'' are alkyl, cycloalkyl, aryl, or aralkyl radicals. The esters may be homogeneous, i. e., R, R', and R'' may be the same alkyl, cycloalkyl, aryl or aralkyl hydrocarbon radicals, or the esters may be of the mixed type in which all three of the radicals may differ from each other or two of the radicals may be the same and the other different. Such esters may be made by employing in the synthesis of the esters one or more suitable hydroxy compounds such as, monohydroxy saturated aliphatic alcohols, e. g., methanol, ethanol, the propanols, the butanols and amyl alcohols, alicyclic alcohols, e. g., cyclohexanol, the methyl- and dimethyl-cyclohexanols and other cyclohexanol homologs, aromatic alcohols, e. g. benzyl alcohol, and phenolic compounds, e. g. phenol, the cresols, the xylenols and other phenol homologs. The preferred hydroxy compounds are cyclohexanol, methylcyclohexanols and mixtures of these alcohols.

The hydrogen chloride accepting organic bases utilized in carrying out the invention are materials containing the pyridine nucleus whose hydrochlorides melt at a temperature not above 110° C. in the presence of the other constituents of the reaction mixture. Such bases include 2-picoline, quinoline and 3-picoline. Mixtures of such bases, e. g. mixtures of 2-picoline and 3-picoline in any proportions, may be employed. Certain bases, such as 4-picoline, 2,6-lutidine, 2,4-lutidine and pyridine, which alone form hydrochlorides of a melting point above 110° C., when mixed with the above bases form hydrochloride mixtures melting below 110° C. For example mixtures of 4-picoline with equal or larger amounts of 3-picoline form mixtures of hydrochlorides melting below 110° C. More complex mixtures containing 2-picoline or 3-picoline or both, together with minor proportions of one or more bases such as 4-picoline, pyridine, 2,6-lutidine and 2,4-lutidine, may be utilized provided these bases are employed in proportions such that the mixture of hydrochlorides formed melt below 110° C. in the presence of the materials constituting the reaction mixture. Larger amounts of 4-picoline and pyridine than of the lutidines may be incorporated in the base mixtures. In general, the amounts of pyridine and 4-picoline should not exceed about 50% by weight of the base mixtures and the amounts of lutidines should not exceed about 10% by weight of the mixtures. Such mixtures of bases which form hydrochloride mixtures melting not above 110° C. may be utilized as hydrogen chloride accepting agents in accordance with the invention. The reference herein to hydrochlorides having a melting point not above 110° C. is intended to include mixtures of hydrochlorides which melt at not above 110° C. in the presence of the other ingredients of the reaction mixture. 2-picoline, the hydrochloride of which melts at about 80° C., is the preferred accepting agent.

As hereinabove pointed out, in some cases it is desirable to carry out the reaction in the presence of an inert organic solvent such as benzene, toluene, cyclohexane, methylcyclohexanes and petroleum hydrocarbons, preferably in amount by volume not in excess of about 10% of the volume of the reactants. In order to facilitate dehydration and recovery of the organic base, as hereinbelow described, it is preferred to employ a solvent which is capable of removing water from the base as an azeotropic water-solvent distillate of materially lower boiling point than the base. The preferred solvents are hydrocarbons boiling within the range of 80° to 125° C. such as benzene, toluene, cyclohexane, methylcyclohexane and petroleum hydrocarbon fractions boiling within the specified range.

The invention may be carried out by slowly adding the phosphorus trichloride to a reaction vessel equipped with a cooling jacket and containing a mixture of the hydroxy compound, organic base and solvent, if a solvent is utilized, while agitating the mixture and controlling the rate of addition of the phosphorus trichloride and the cooling of the vessel to maintain the temperature of the reaction mixture within the range of 60° to 95° C., preferably 70° to 85° C., until the reaction is complete or nearly complete. The temperature of the mixture should be maintained high enough to prevent formation of sufficient solid hydrochloride to interfere seriously with the intermixture of the reactants and efficient heat transfer. Ordinarily the temperature is regulated so the hydrochloride is at least partially in molten condition during the later stages of the reaction when the amount of hydrochloride present is large. In order to obtain tri-esters of optimum clarity and minimize side reactions such as chlorination, the organic base and hydroxy compound are each employed in excess of the theoretical 3 mols of the base and 3 mols of the hydroxy compound for each mol of the phosphorus trichloride. An excess of the base also lowers the melting point of the hydrochloride formed during the reaction. Preferably, from 3.8 to 4 mols of the base and from 3.05 to 3.2 mols of the hydroxy compound are utilized for each mol of the phosphorus trichloride. While the use of solvent may be dispensed with entirely, it is frequently desirable to carry out the reaction in the presence of a limited amount of solvent for facilitating recovery of the base. Further, use of solvent is beneficial in that it renders the hydrochloride somewhat more insoluble in the ester. It is advantageous to employ not more than 10 per cent of solvent, based on the volume of the remaining ingredients of the reaction mixture; this compares with at least about 90 per cent of solvent heretofore required for satisfactory production of the esters.

When the reaction is complete or nearly complete, the temperature of the reaction mixture is raised above the melting point of the hydrochloride of the organic base employed as the hydrogen chloride acceptor, e. g., above 80° C. when 2-picoline is utilized as the acceptor, and the mixture is permitted to stand until it stratifies into two clearly defined layers, the upper of which contains substantially all of the tri-ester and the lower of which contains the molten hydrochloride. The two layers are separated in any suitable manner, e. g., by decantation or siphoning, and the ester layer may then be purified by subjecting it to fractional distillation under vacuum to separate unreacted base, hydroxy compound and solvent, if present, as distillate from the ester. During the distillation, residual hydrochloride dissolved in the ester is also driven off as distillate.

The base may be recovered from the hydrochloride layer by treating it with water and an alkali such as ammonia, sodium hydroxide or sodium carbonate. The liberated base and aqueous alkali chloride solution settle into two layers and are separable by decantation or siphoning. The base dissolved in the salt layer is recoverable by extraction of this layer with a solvent of the type hereinabove disclosed, such as toluol. The separated base may be dehydrated for reuse in the process by mixing the distillate recovered from the ester, or fresh solvent, therewith and distilling the mixture so as to drive off the water as an azeotropic mixture with the solvent, permitting the condensed distillate to stratify into two layers and returning the non-aqueous layer to the still or fractionating column. The aqueous portion of the distillate may be utilized as solvent for alkali for treatment of additional hydrochloride.

The following examples are illustrative of the invention:

Example 1

306 grams of cyclohexanol and 350 grams of 2-picoline were charged into a water cooled reaction vessel and heated to 70° C. 137 grams of phosphorus trichloride were slowly added to the reaction vessel over a period of about 20 minutes while agitating the contents of the vessel and maintaining the temperature of the mixture by regulating the cooling and the rate of addition of the trichloride at from 70° to 76° C. during addition of the initial two-thirds of the trichloride and at 80°-82° C. during the addition of the remainder of the trichloride. The temperature of the reaction mixture was then raised to 92°-95° C. and the agitation was discontinued; within 15 minutes the mixture stratified into a lower layer of picoline hydrochloride and an upper layer of tricyclohexyl phosphite. The lower layer was siphoned off, the upper layer was allowed to cool to 70° C., removed from the reaction vessel and distilled at 45 mm. of mercury pressure until the unreacted picoline was distilled off. The residual picoline hydrochloride present in the ester was also distilled off during removal of the picoline. The crude ester was then subjected to distillation at pressure of 5 to 10 mm. of mercury at a still temperature of 150°-160° C. to remove hydrocarbon solvent and excess reagents. A still residue of 297 grams of ester product of which about 90-95 per cent was tricyclohexyl phosphite and the remainder was dicyclohexyl phosphite, was recovered.

Example 2

805 parts by weight of cyclohexanol, 865 parts by weight of 2-picoline and 150 parts by weight of toluol are charged into a water cooled reaction vessel equipped with an agitator and heated to 70° C. 340 parts by weight of phosphorus trichloride are slowly added to the reaction vessel while agitating the contents of the vessel and maintaining the temperature of the mixture at from 70° to 75° C. by regulating the cooling and the rate of addition of the trichloride. After addition of the trichloride the temperature of the mixture is raised to about 90° C. and agitation is discontinued. The mixture stratifies rapidly and sharply into an upper layer containing the ester and a lower layer containing picoline hydrochloride. The lower picoline hydrochloride layer is run off through a steam heated pipe line; a small amount of the lower portion of the ester layer may also be run off, collected separately, allowed to cool to solidify the hydrochloride and the ester poured off into the ester layer. The ester layer is allowed to cool, removed from the reaction vessel and evaporated under vacuum to distill off the toluol, unreacted reagents and residual hydrochloride. The vapors are passed through a scrubber into contact with dilute, e. g. 20 per cent, sulfuric acid to remove the picoline therefrom. More than 95 per cent of the theoretical yield of ester product, of which about 90-95 per cent is tricyclohexyl phosphite and the remainder is dicyclohexyl phosphite, is obtained.

The picoline hydrochloride is treated with aqueous sodium hydroxide solution of 20 per cent concentration, whereupon picoline is liberated and separates rapidly as a clear upper layer, the lower layer being aqueous sodium chloride solution containing a little dissolved picoline. This layer is drawn off, mixed with the distillate recovered from the ester, and distilled until substantially all of the water is removed therefrom as an azeotropic mixture with toluol, the distillate stratified and the toluol layer returned to the still as reflux. The aqueous distillate containing a little picoline may be employed as solvent for sodium hydroxide for treatment of additional picoline hydrochloride. The still residue is constituted of picoline, toluol and cyclohexanol and is suitable for reuse in the preparation of additional tricyclohexyl phosphite. Additional picoline may be recovered by extracting the aqueous sodium chloride with toluol until the picoline is removed therefrom or distilling the salt solution until most of the picoline is removed and utilizing the resultant aqueous distillate as solvent for the sodium hydroxide employed in the process. By operating in this manner at least 97 per cent of the picoline utilized in the preparation of the ester may be recovered.

Thus it will be seen the invention provides a novel process for the production and isolation of tri-esters of phosphorous acid without washing the esters with water or filtration, and hence avoids the difficulties accompanying these steps. Further, the process permits elimination of much or all of the solvent heretofore required for making the esters, thereby increasing the capacity of the equipment employed.

Since certain changes may be made without departing from the scope of the invention, it is intended that the above shall be interpreted as illustrative and not in a limiting sense.

What is claimed is:

1. The process of making esters of phosphorous acid which comprises reacting a compound selected from the group consisting of alcohols and phenols with phosphorus trichloride in the presence of an organic base having a tertiary nitrogen atom which reacts with the hydrogen chloride liberated during the reaction to form a hydrochloride having a melting point not above 110° C. and separating the hydrochloride in the liquid phase from the ester at a temperature above the melting point of the hydrochloride.

2. A process of making tri-esters of phosphorous acid which comprises reacting a compound selected from the group consisting of alcohols and phenols with phosphorus trichloride in the presence of an organic base containing the pyridine nucleus which reacts with the hydrogen chloride liberated during the reaction to form a hydrochloride having a melting point not above 110° C., permitting the reaction mixture to stratify and form an ester layer and a molten hydrochloride layer at a temperature above the melting point of the hydrochloride and separating the layers.

3. A process of making tri-esters of phosphorous acid which comprises reacting a compound selected from the group consisting of alcohols and phenols with phosphorus trichloride in the presence of an organic base containing the pyridine nucleus which reacts with the hydrogen chloride liberated during the reaction to form a hydrochloride having a melting point not above 110° C., raising the temperature of the reaction mixture during the reaction to prevent at least a portion of the hydrochloride from crystallizing in solid form, permitting the reaction mixture to stratify at a temperature above the melting point of the hydrochloride when the reaction is complete and form an ester layer and a molten hydrochloride layer, and separating the layers.

4. In a process of making tri-esters of phosphorous acid which comprises reacting a monohydroxy saturated alcohol with phosphorus trichloride, the improvement which comprises carrying out the reaction in the presence of an organic base containing the pyridine nucleus which reacts with the hydrogen chloride liberated during the reaction to form a hydrochloride having a melting point not above 110° C., permitting the reaction mixture to settle and from an ester layer and a molten hydrochloride layer at a temperature above the melting point of the hydrochloride and separating the ester from the hydrochloride.

5. A process of making tri-esters of phosphorous acid which comprises reacting a cyclohexanol with phosphorus trichloride in the presence of 2-picoline which reacts with the hydrogen chloride liberated during the reaction to form 2-picoline hydrochloride, raising the temperature during the reaction to at least about 80° C. to prevent at least a portion of the hydrochloride from crystallizing in solid form, and separating the hydrochloride in the liquid phase from the ester at a temperature above the melting point of the hydrochloride.

6. A process of making tri-esters of phosphorous acid which comprises reacting a compound selected from the group consisting of alcohols and phenols with phosphorus trichloride in the presence of a solvent which forms an azeotropic mixture with water and in the presence of an organic base containing the pyridine nucleus which forms with the hydrogen chloride liberated during the reaction, a hydrochloride having a melting point not above 110° C., permitting the reaction mixture to stratify into a hydrochloride-containing layer and an ester-containing layer at a temperature above the melting point of the hydrochloride, separating the layers, and distilling off the solvent and unreacted materials from the ester layer.

7. A process as defined in claim 5 in which there is employed a hydrocarbon solvent boiling within the range of 80° to 125° C.

8. A process as specified in claim 5 in which the alcohol is cyclohexanol and toluol solvent in amount not exceeding 10 per cent of the total volume of the reactants is employed.

KARL H. ENGEL.